United States Patent [19]
Sutton

[11] Patent Number: 5,214,652
[45] Date of Patent: May 25, 1993

[54] ALTERNATE PROCESSOR CONTINUATION OF TASK OF FAILED PROCESSOR

[75] Inventor: Arthur J. Sutton, Cold Spring, N.Y.

[73] Assignee: International Business Machines Corporation, Armonk, N.Y.

[21] Appl. No.: 675,393

[22] Filed: Mar. 26, 1991

[51] Int. Cl.$^5$ .............................................. G06F 15/00
[52] U.S. Cl. ........................................ 371/9.1; 371/13
[58] Field of Search ..................... 371/9.1, 12, 13, 11.3

[56] References Cited

U.S. PATENT DOCUMENTS

| | | | |
|---|---|---|---|
| 4,872,106 | 10/1989 | Slarer | 371/9.1 |
| 4,970,640 | 11/1990 | Beardsley et al. | 371/9.1 |
| 5,077,663 | 12/1991 | Kanazawa | 371/9.1 |

Primary Examiner—Vincent P. Canney
Attorney, Agent, or Firm—Bernard M. Goldman

[57] ABSTRACT

Completes on a another CPU the execution of a program, or program task, terminated by a processor error on a first CPU without re-executing any successfully-completed instructions and without any abnormal ending being provided to the program. The continued program need not have any built-in recovery or correction code. Predetermined register contents in the failed processor are stored in predetermined storage locations by the the failing processor or by a service processor (SP) when the failing processor has not been able to store this information. The predetermined contents saved from the failed processor are defined by the system architecture for saving an interruption of a program to enable the continuation of execution of the program after restoring the contents of PSWs, CRs, FPRs, GPRs, ARs, etc. if using the ESA/370 architecture. When a failed processor is detected, the SP issues an external interruption to other processors in the system that are operable for continuing the execution of the failed processor task after the required information is stored. Special indicators are stored in predetermined places in the system and/or microcode memory that is accessible to the SP and to the healthy processors in the system selectable for continuing the task's execution.

29 Claims, 9 Drawing Sheets

FIG. 3

PRIOR ART (MALFUNCTION ALERT (MFA) SIGNALLING)

(SP STARTS MFA PROCESS WHEN A CHECKSTOP SIGNAL IS REQUIRED FOR CPUf)

↓

31. SP WRITES MACHINE CHECK(MC) CHECKSTOP CODE INTO PRIVATE HSA AREA OF CPUf

↓

32. SP WRITES CPUf IDENTIFIER(ID) INTO PRIVATE HSA AREA OF EVERY OTHER CPU IN SYSTEM

↓

33. SP SIGNALS ALL CPUs EXCEPT CPUf TO TAKE AN MFA EXTERNAL INTERRUPTION

↓

34. FIRST CPU TO BE INTERRUPT-ENABLED WILL TAKE THE MFA EXTERNAL INTERRUPT

↓

END MFA PROCESS

ALTERNATE PROCESSOR CONTINUATION OF TASK OF FAILED PROCESSOR

INTRODUCTION

The invention allows another CPU in a multiprocessor configured system (MP) to continue the execution of a program without checkpointing, reexecution, or repeating execution of any completed instructions in a program when its executing CPU failed during execution and before its completion.

BACKGROUND

In todays systems designed to operate with more than one CPU, when a processor detects an error, it attempts to correct the problem by a retry, such as by retrying the instruction in which the error occurred, or by re-executing the program in which the error occurred. Checkpoint retry recovery is available only if a program is designed to store checkpoint data at various times during its execution. The retry techniques are limited to intermittent types of errors, and if a solid error occurs in the hardware, it will persist through all retry attempts, so a maximum number of retries is used and then a solid (uncorrectable) error is declared if the error remains. Detection of a solid error will cause the CPU to generate a machine check (MC) interruption.

The MC interruption signals the system control program and provides a MC new PSW (program status word) which addresses an entry instruction in a recovery manager program within the system control program. The system control program then may attempt to re-execute the interrupted instruction to see if the error condition goes away. If the error condition does not go away, the system control program declares an abnormal end (ABEND) for the task that had its execution terxinated by the error condition in its processor. Dependent on the type of recovery support built into the terminated program, it may or may not be able to recover. Often a program lacks the ability to recover when it is terminated at an unplanned point in its execution, even when it has not lost its input data. And when input data is lost due to an unplanned stoppage before execution is complete, programs using real time data (such as from a teller machine or a process control sensor) cannot recover their input data, and therefore the attempted recovery fails even when an intermittent hardware error is corrected.

The normal CPU operation of executing dispatched tasks is ended by putting the CPU in a checkstopped state (stopping the CPU internal cycle clocks) if the re-execution of an instruction continues to fail, which determines a solid hardware error exists. The operating system software may maintain a retry threshold after which the CPU is checkstopped.

A checkstopped CPU is marked a failed CPU by the system control program, so that it will not have any more program tasks dispatched on it.

SUMMARY OF THE INVENTION

The subject invention is able to continue execution of most program tasks interrupted by a processor failure after all hardware retry attempts have failed. Thus, the invention is usable to continue to successful completion the hardware terminated execution of an operating system program or an application program without any abnormal end (ABEND) being provided to the program. The use of this invention is not dependent on the terminated program having any built-in recovery or correction code.

Use of the invention can avoid the reexecution of any successfully-completed instructions in, or of any checkpoint retrying of, a program task that is terminated by a processor error. That is, the invention is capable of finishing the terminated task on another CPU for most errors that cause a termination of the task.

However, the invention prefers that a processor not be removed from system operation unless the terminating error is significant. In particular, an intermittent error that may shortly go away is common in computer systems and are often are caused by alpha particles. The invention recognizes that a hardware error condition may go away in a short time so it allows for a retry of the instruction having an error, up to some threshold number of times during which enough time has expired to permit the error to go away if it is an intermittent type of error. Then, if the error goes away, the CPU is saved as a system resource and it can continue to be used by the system.

Further, the efficiency of system operation is improved by the subject invention even when the terminated task cannot be continued after its CPU failure, because the invention is able to obtain information not previously available for identifying system resources being used by the terminated task. The invention provides this information to the operating system so that it can obtain a release of these system resources to allow the released resources to be used by other tasks (rather than remaining unusable by continuing to be bound to an unrecoverable task). System efficiency is dependent on the efficient use of its resources.

The subject invention requires unique modifications in a service processor (SP) and in the operating system (OS) software of a system for performing the novel methods required by the subject invention. Modification of the hardware or microcode of the CPUs in a system is optional, depending on the architecture of the CPUs.

The SP's recognition of failure by another processor may be detected in any of a number of ways, such as the failing processor signalling its failure to the SP by sending a special signal to one or more other processors, or by the SP detecting that a processor does not respond to a special request, or by the OS detecting that a processor has not done anything for a period of time with a task and performing the required operations.

In this invention the abnormal end (ABEND) process is avoided for tasks terminated by processor failure where in most cases ABENDs had to be used in the past. Instead the job represented by the terminated task is continued on another processor due to intervention by the SP, which accesses predetermined registers in the failed processor and stores their contents in predetermined memory locations when the failing processor has not been able to store this information. These predetermined registers in the failed processor are all registers required by the system architecture to be saved in memory on an interruption of a program for enabling the continuation of execution of the program after its interruption (e.g. storing and restoring the content of all of its PSWs, CRs, FPRs, GPRs, ARs, etc.).

When the SP detects a failed processor, the SP issues an external interruption to other processors in the system that may be usable for continuing the execution of the failed task. The external interruption signal is sent after the SP or the failed processor has stored the required interruption information and special indicators into predetermined places in system and/or microcode memory that is accessible to the SP and to the healthy processors in the system selectable for continuing the task's execution.

A healthy processor in the system is selected to continue the execution of the task after its termination on the failed processor. The selected healthy processor can be any operable processor in the system which is dedicated to, or shared by, the same operating system that was controlling the failed processor.

The processor selection process may involve the normal interruption operation in the system, whereby the first healthy processor to be enabled for external interruption will recognize and handle the interruption, and thereby continue the CPU-failed task from its point of interruption until the task is completed, or next interrupted. This invention has found that tasks normally lost by being abended have instead been successfully completed by this invention.

The register contents of the failed processor are verified when they are saved by the SP and their validity indicated for determining if the terminated task can be continued. The verification is done, for example, by parity checking the content of each of the failed processor's registers as it is read for being saved, and setting a valid bit in a special memory area for each type of saved register.

Even if the content of some of these failed processor's registers is not valid (which prevents the continuation of the terminated processor program), this invention still allows the stored register information which is valid to be used to identify some or all of the system resources assigned to terminated program to obtain a release of such resources to the system and thereby increase the size of the pools of resources available for use by subsequent tasks to increase the efficiency of subsequent system operations.

This invention may require special support in the system hardware, microcode and/or operating system (e.g. MVS, VM or PR/SM), and may provide a unique "checkstop log out bit" in the logout area of the failing processor's program save area (PSA) in system storage to signal the existence of a failed processor's incomplete task needing a continuation of execution on another processor.

The SP may also determine that because the hardware has become degraded due to past errors resulting in performance degrading corrections (e.g. a failed portion of its cache has been deconfigured) to checkstop a CPU before it reaches a solid error condition due to further degradation beyond tolerable limits, and do a checkstop of the CPU and replace the parts that will correct its degradation problem. This is an error-preventative operation (since it is done before the processor has an error), resulting in preventative maintenance, and it has a high probability of preventing an error from occurring in the CPU. This decision can be made during a task by using this invention to complete the task on another CPU.

DETAILED DESCRIPTION OF THE BACKGROUND PROCESS

Figure 1:
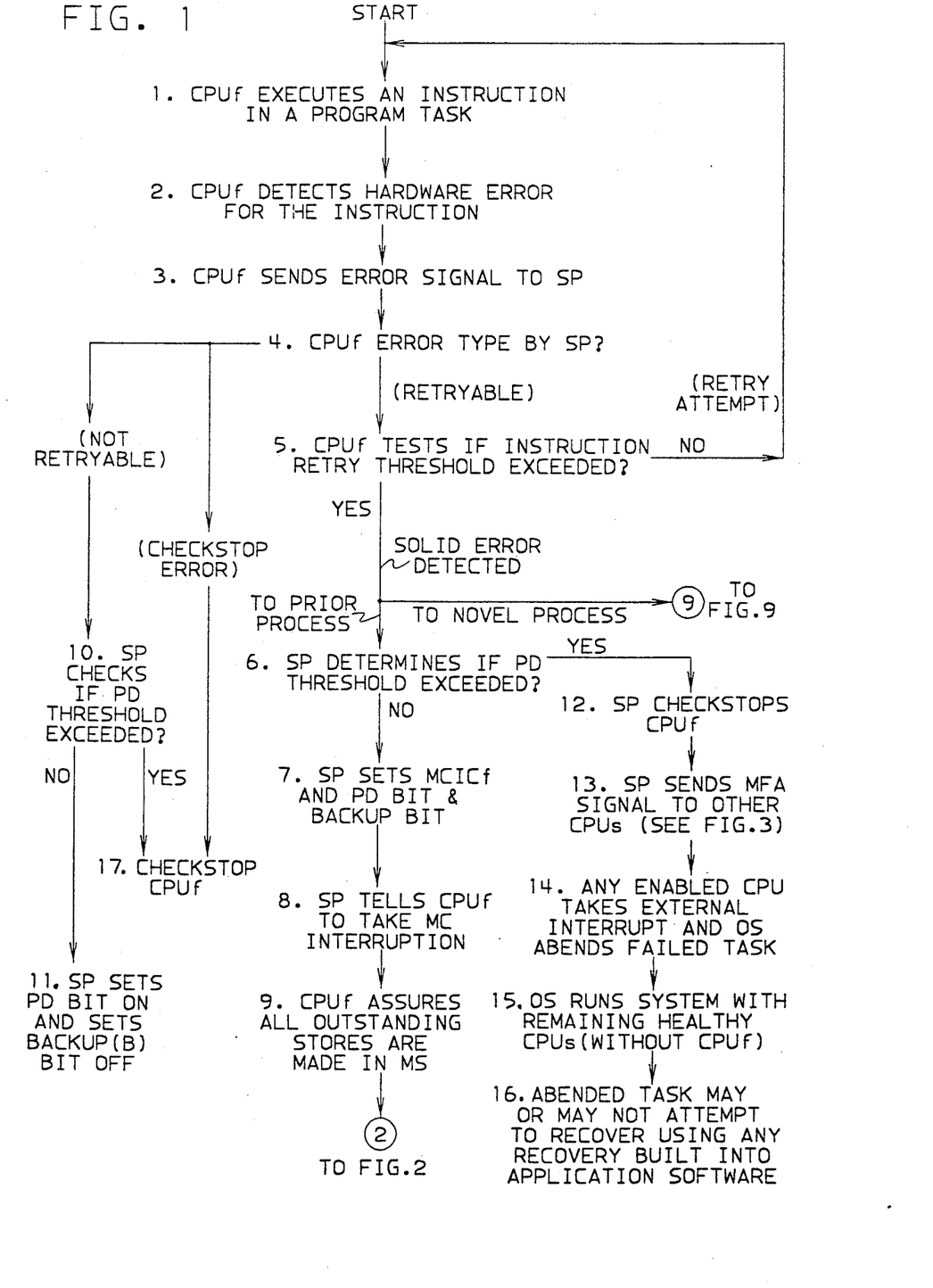
FIG. 1 is a flow diagram of the detection of a task termination due to a error occurring on any processor (CPUf) in a multiple processor (MP) system. Most of the process shown in this figure is prior art but it shows where an embodiment of the invention deviates from and bypasses the prior process.
Figure 9:
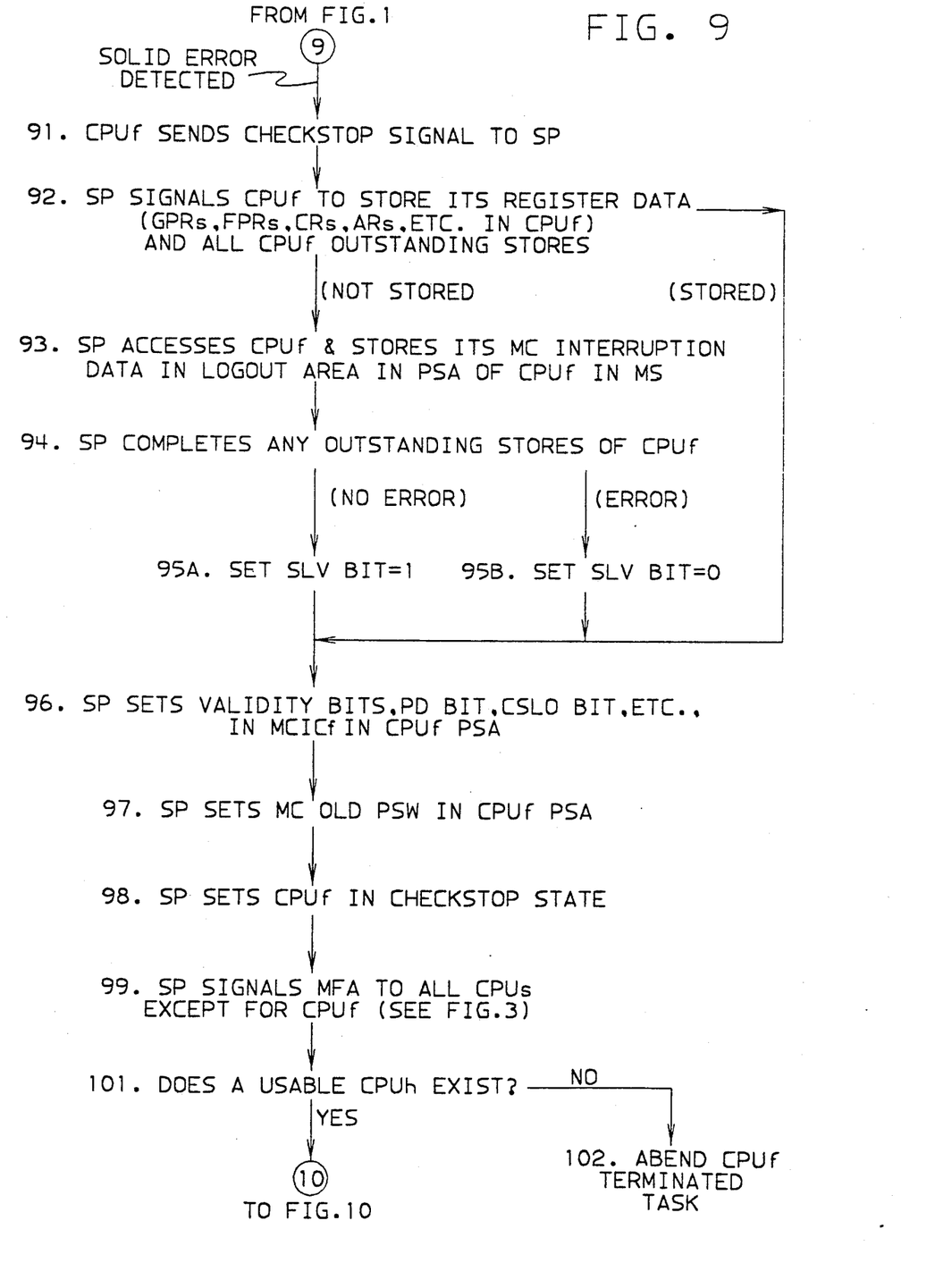
FIGS. 9 and 10 provide a flow diagram of processing steps used by the preferred embodiment of the invention.

The preferred embodiment of the invention is represented by a process that begins in FIG. 1 and continues in FIGS. 9 through 11. FIGS. 1 through 3 mostly represent background prior art useful in understanding the invention. The invention is concerned with a program executing on any CPU in a multiple processor (MP) system when a hardware condition occurs in any CPU and prevents the CPU from continuing execution of its current program. The hardware condition (referred to as a hardware error) may be a failure in the hardware circuits, or may be in the microcode of the CPU. The failure will likely occur during the execution of some instruction in the program, but it may also occur during an interruption execution between instruction executions.

Herein, a CPU having an error is referred to as CPUf, meaning CPU(failure). Any operational CPU in the system which does not have any error is referred to as CPUh, meaning CPU(healthy).

Large computer systems dispatch programs in work units of program execution, called tasks. Each task may comprise one or more programs and data that execute together. The preferred embodiment of the invention was developed on an IBM ESA/370 MP system, which has its architecture described in a publication having form number SA22-7200 entitled "ESA/370 Principles of Operation" is incorporated herein by reference into this specification in which chapters 4, 5, 6 and 11 are particularly pertinent.

Figure 4:
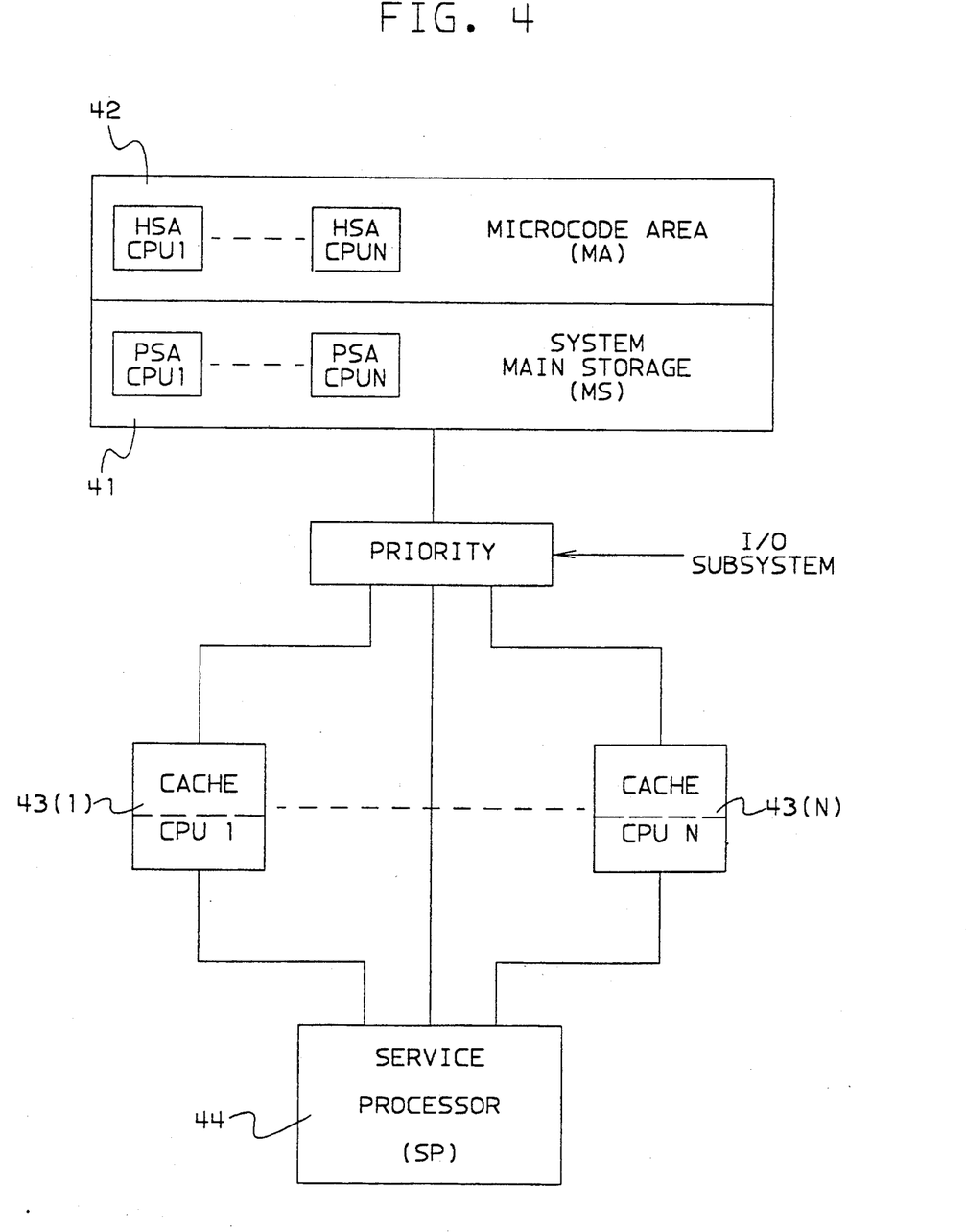
FIG. 4 represents a multiprocessor system using the invention.

FIG. 4 shows an MP system in which the preferred embodiment may be used. It contains a plurality of CPUs 1 through N, and a service processor (SP). However the SP function may be performed in any of CPUs 1-N to eliminate the need for a separate processor. However the preferred embodiment prefers a separate processor, even though the invention comprehends not having a service processor and doing the SP steps in this invention using one of the CPUs.

The MP in FIG. 4 has a system hardware memory that includes a hardware part 41 referred to as the system main memory (MS) which contains all absolute addresses usable by the operating system software (OS) and all applications programs (applications) that run on the system. Another hardware part 42 referred to as the microcode area (MA) is reserved for microcode use by the CPUs and system. The MS contains the prefix areas for the respective CPUs in the system which are accessed by the OS. The MA contains respective hardware save areas for the CPUs accessed by microcode of the respective CPUs.

Figure 5:
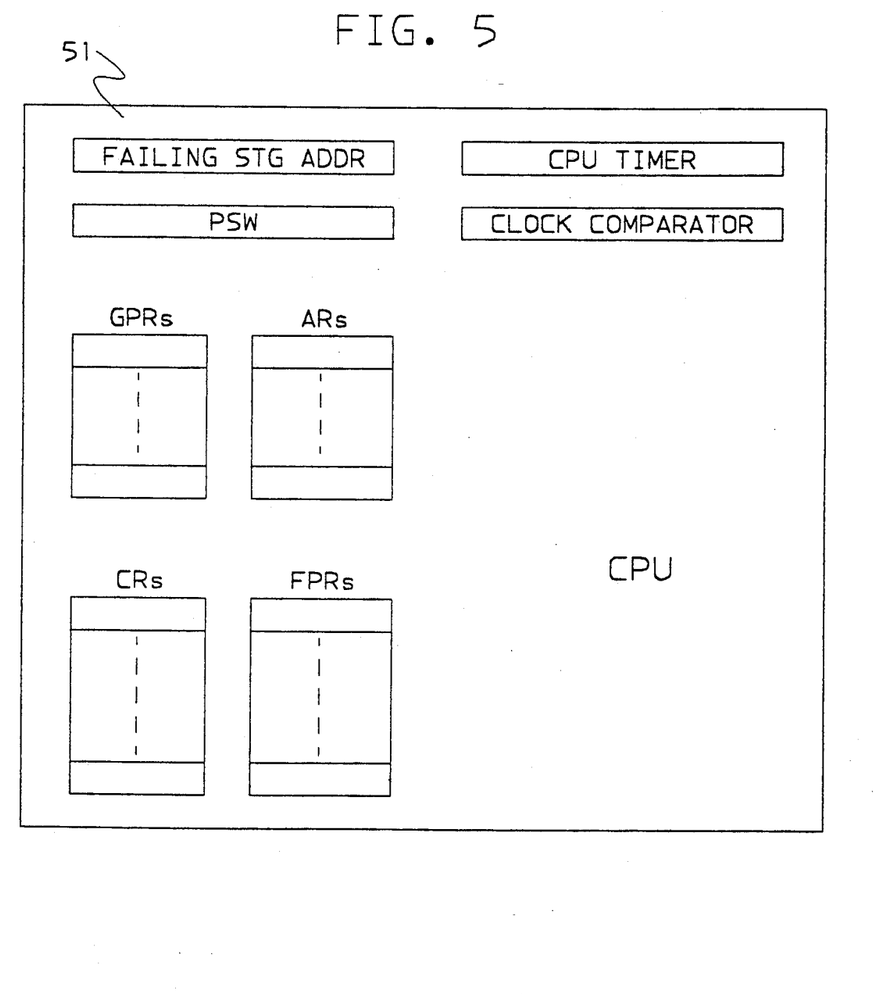
FIG. 5 represents an example of register contents in each CPU in an MP system available for use by the invention.
Figure 7:
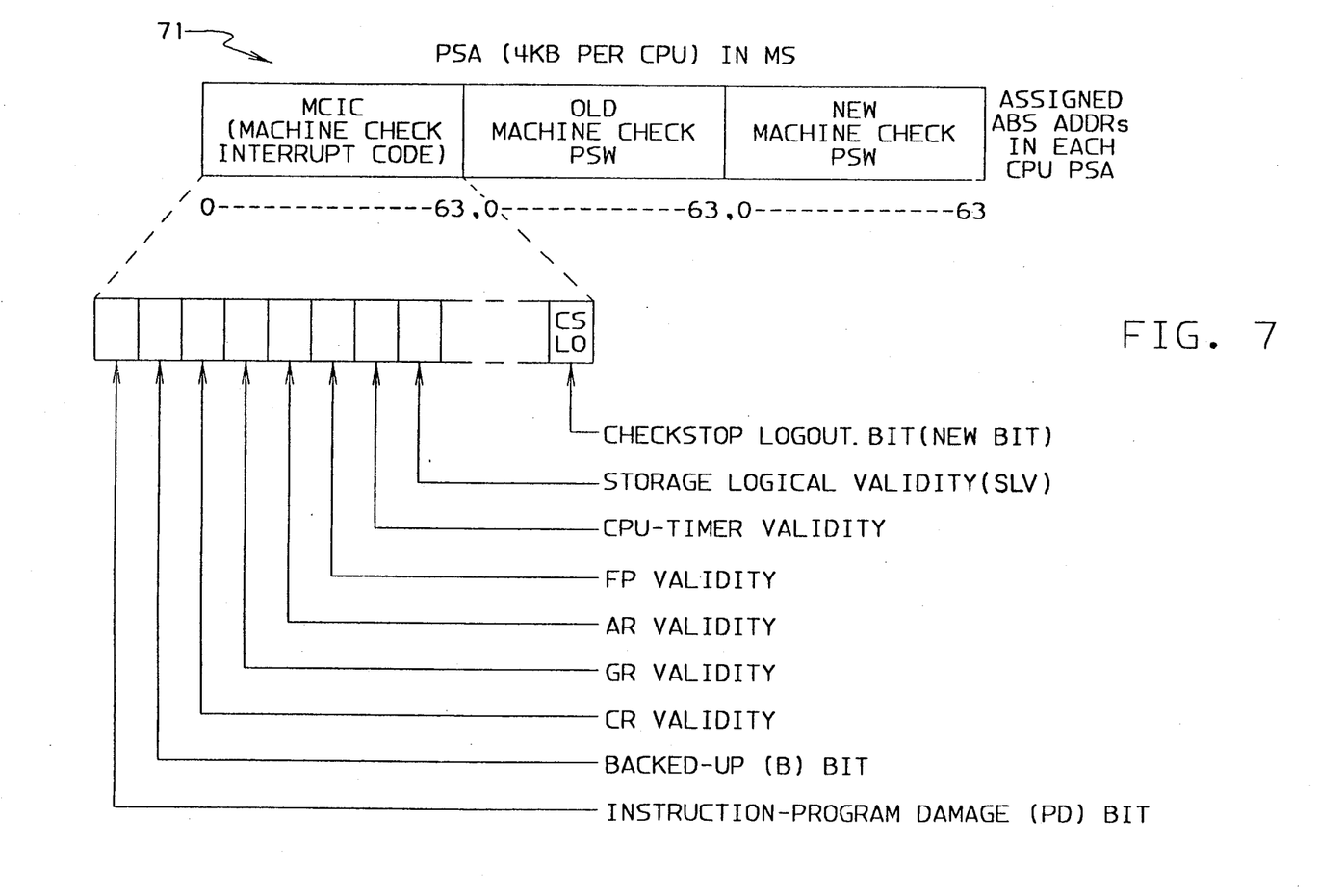
FIG. 7 shows a part of the prefix save area (PSA) in system main storage (MS) in which critical information is stored by a machine check interruption of any CPU in the system using the ESA/370 architecture in a preferred embodiment of the invention.

FIG. 5 represents the most important registers in each CPU that need to be save in the PSA of the respective CPU in MS upon an interruption of the CPU's operation. These are not the only registers needing to be saved upon interruption, which are more precisely defined in the ESA architecture book referenced above in its chapter 11 sections entitled "Check-stop State", "Machine-Check Interruption", and "Machine-Check-Interruption Code". FIG. 7 represents part of the PSA for any CPU upon the occurrence of a MC interruption, showing a blow-up of the MCIC field in the PSA. The representation in FIG. 7 is exemplary, and the complete MCIC representation is available in the prior art above referenced section entitled "Machine-Check-Interruption Code".

The interruption signalling to the PSAs of the processors is done by the external interruption defined in a section entitled "External Interruption" in the previously referenced ESA/370 chapter 6. Also, signal processor (SIGP) instruction operations are described in chapter 4 entitled "CPU Signaling and Response" in this same book.

Figure 8A:
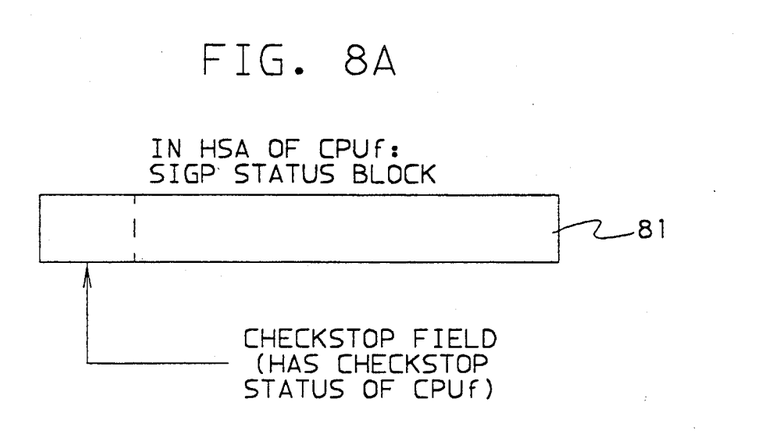
FIG. 8A represents the SIGP status block in the hardware storage area (HSA) of CPUf.

FIG. 8A represents the SIGP status block in the HSA for any CPU. A checkstop field in the HSA block for any failed CPUf is set by the SP. A SIGP instruction to a CPUf indicates when the respective CPU is in a checkstop condition.

Figure 8B:
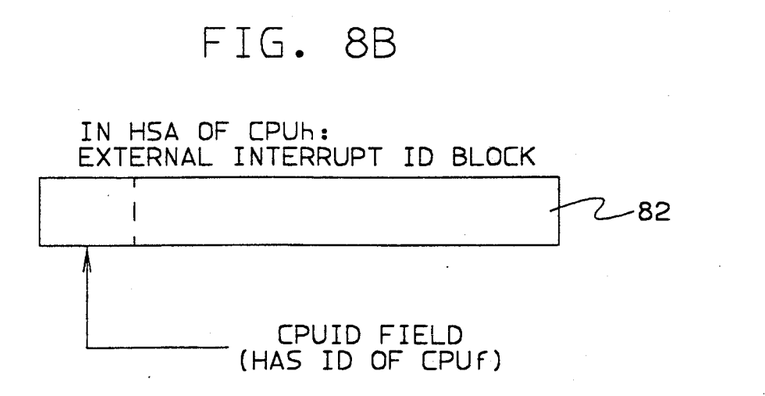
FIG. 8B represents the external interruption identifier block in the HSA of CPUh.

FIG. 8B represents the external interruption CPU ID block in the HSA for any CPU. The CPU ID field in this block receives the CPU ID of a failing CPUf set by the SP.

The processing FIGUREs show steps of a process, and each step is given a reference number, in which the left-most digit is the same as its FIGURE number (except in FIG. 1), and the remaining digits are unique in the respective FIGURE.

Step 1 in FIG. 1 represents the execution of any instruction or interruption in any task by any CPU in a multiple processor system. Step 2 is the detection in any CPU of a hardware error condition, so that the CPU becomes the CPUf in the MP system.

All hardware errors are tracked in the MP system by the service processor (SP). Each time a hardware error is detected in any CPU, it is reported by the CPU by step 3 sending an error signal to the SP.

Figure 6:
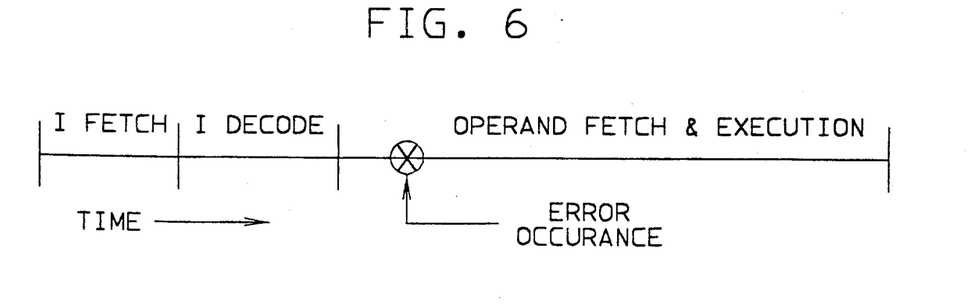
FIG. 6 is a timing diagram of instruction processing showing an example of when ar error might occur during pressing of any instruction.

FIG. 6 is an example of when a hardware error might occur during the execution of an instruction, in which the error is shown to occur during the operand fetch and execution period.

When step 3 reports an instruction error to the SP, the SP classifies the error into one of three categories: retryable error, non-retryable error, or checkstop error. Most errors are retryable and then step 5 is entered and processed by CPUf. But there are error conditions that are not retryable, for example if an address error occurs in the prefix register of the CPUf, so that its PSA cannot be found; this prevents any interruption handling for such a CPUf, and no retry is possible for it, so that step 17 is immediately entered to checkstop that CPUf. If the prefix address is valid, then even though the error prevents the instruction from being retryable, an interruption can be set and recognized for the CPUf. Step 10 then is performed in which the SP checks if the PD threshold has been exceeded, and if so the SP does a checkstop for CPUf, but if the threshold is not exceeded the SP merely sets the processor damage (PD) bit on and sets off the backup bit (B) in step 11.

The error is determined as solid or intermittent by step 5 having CPUf retry an instruction having an error. If the error is intermittent, it will go away during one of the retry loops, and the next instruction is then executed, etc. until the task is successfully complete if no error is detected.

A solid error is determined if the error persists through each retry of the instruction until the number of retries exceeds some threshold number, called an instruction retry threshold, which is tested by step 5. Thus, if the error persists when the threshold is reached, the error is considered a solid error (it is unlikely to be corrected by the passage of time).

If a solid CPU hardware error occurs during a CPU interruption operation, there is no incomplete instruction to retry since interruption occurs between instruction executions. And the process will not branch back to step 1 to make any instruction retry effort. Instead the hardware in the system will attempt to recover the interruption by comparable prior art techniques and similarly may declare a solid error. But whether a solid error occurs during execution of an instruction or during an interruption operation, the current program on the failing CPUf is terminated in the failed CPUf.

After a solid error condition is determined, the prior art process may be continued by entering step 6, or the novel process of the preferred embodiment of the invention may be performed by entering FIG. 9. However, this invention is better understood if the prior art process is first explained, so step 6 is assumed to be entered here.

When the prior art process determines a solid error exists, step 6 increments a processor damage (PD) count and compares the count to a PD threshold. The PD count is the number of solid errors detected over some period of time, such as over an eight hour period. The PD count is incremented by one each time a solid error is determined, and the resulting number is compared to a PD threshold value which is the maximum number of solid errors allowed in a CPU over the chosen period of time, such as eight hours. If step 6 determines the threshold has not been exceeded, step 7 is executed. If the threshold has been exceeded, step 12 is entered.

In step 12 the SP checkstops CPUf. In step 13 the SP sends a malfunction alert (MFA) signal to the other CPUs in the system, indicating to the other CPUs that CPUf is failing. MFA signalling step 13 is shown in detail in FIG. 3. In step 14, the MFA signalling by the SP causes an external interruption for any of the other CPUs, i.e. conventional PSW swapping is done in the external interruption area in the PSA in MS for the CPU. Any interruption-enabled CPU in the system can take the conventional external interruption, which uses the new PSW in any other CPU PSA to address an CS routine that will ABEND (terminate) the current task on CPUf.

Then, in step 15 OS continues to run the system but with the remaining healthy CPUs (without CPUf).

Optional step 16 recognizes that some programs have designed within their code the ability to recover from some types of error conditions, although most programs do not have any, or have inadequate, recovery capability. If the terminated program has a built-in recovery capability, it may attempt to use it to complete its execution.

This invention does not use any internal recovery capability that may be built into any program, because the invention can continue the execution of a program independent of any internal recovery capability.

However, if step 6 finds the PD threshold has not been exceeded, step 7 is executed in which the SP sets the PD bit and the B bit within the the MCIC (machine check interrupt code) field in the PSA for CPUf. Then in step 8, the SP signals CPUf to provide the MC (machine check) interruption by storing its current CPUf PSW as the old MC PSW and to access the new MC PSW, which invokes step 21 in FIG. 2.

And step 9 requires assurance that all outstanding stores in CPUf (stores completed by CPUf but not yet put into MS) are made in MS. This can be done by CPUf sending all of its outstanding stores onto a bus to MS outside of CPUf which will not be affected when the operation of CPUf is checkstopped. Step 9 can be done in parallel with any one or more of SP steps 6, 7 and 8 even though it is shown at the end of the process in FIG. 1.

Figure 2:
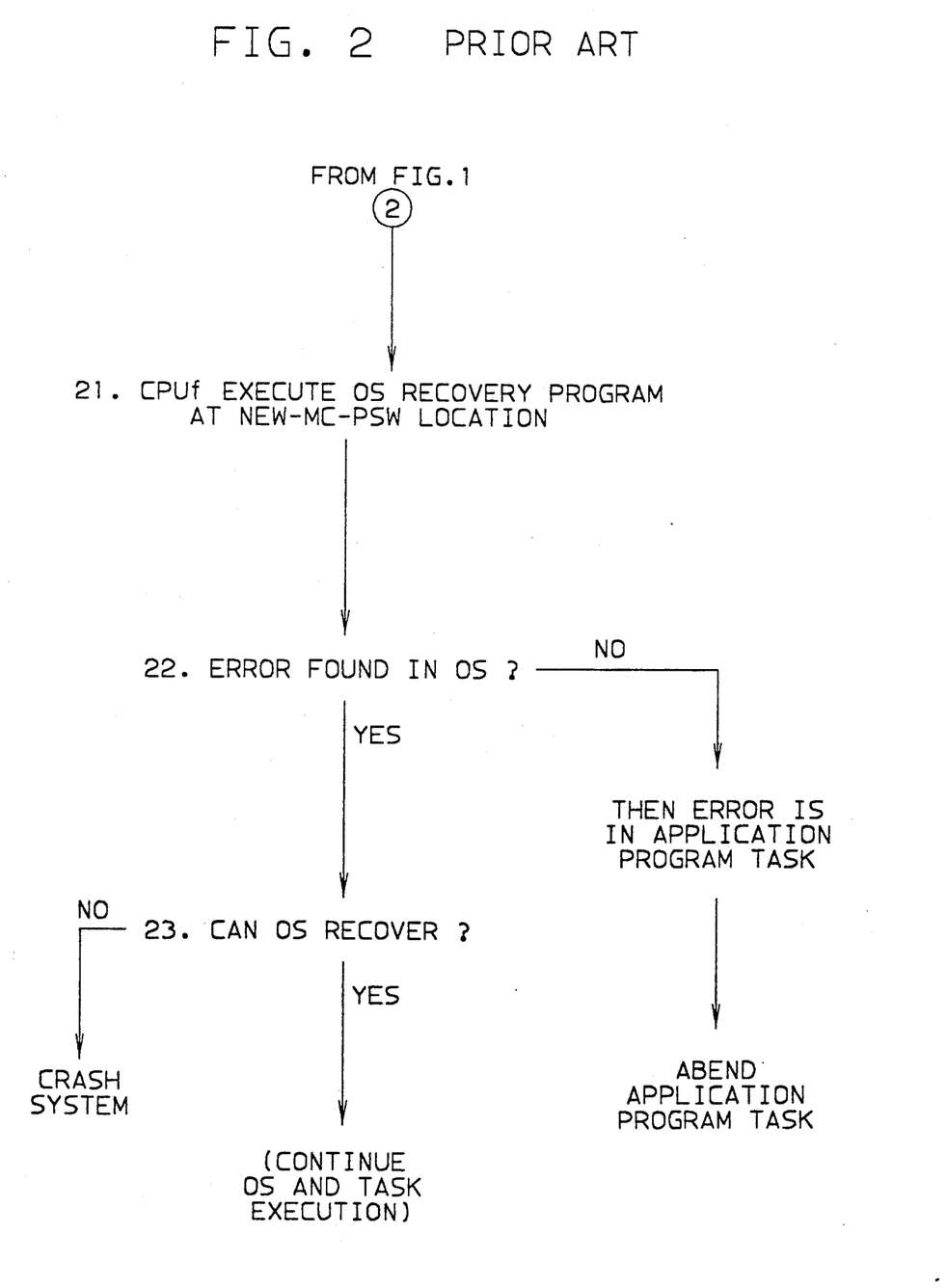
FIG. 2 is a continuation of the prior art flow diagram started in FIG. 1.

In FIG. 2 step 21 uses the new PSW address to enter an operating system (OS) recovery routine that attempts to recover the terminated program on CPUf. Step 22 determines whether the hardware error occurred during execution of an OS or application program. If the error occurred during an OS program, step 23 is entered to determine how pervasive the error damage is, and if it is a type of error that may affect the integrity of the system the no exit is taken to crash the system (i.e. terminate system operation) to allow manual intervention to correct the error. But if the error only affects the operations on CPUf or is correctable, then step 23 takes its yes exit to continue the OS and terminated program's execution.

However, if step 22 finds the error is not in the OS software, but is in the currently executing application, then only the current application is ABENDed, and the system continues operating with the remaining CPUs (without CPUf). But the ABENDed task may not be recovered in this prior art scenario.

Figure 3:
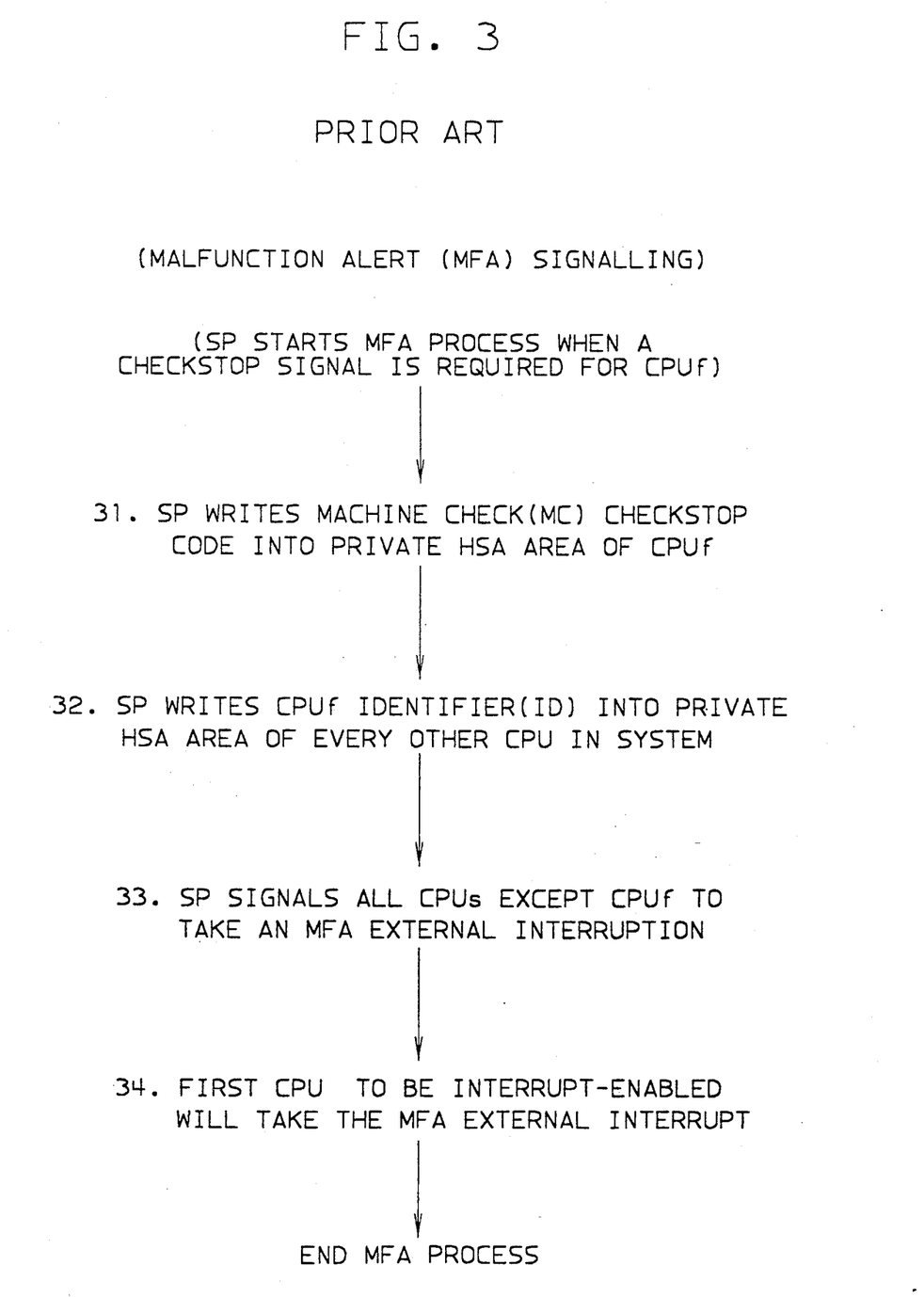
FIG. 3 is a flow diagram blow-up of the malfunction alert (MFA) signalling step shown in FIG. 1.

FIG. 3 represents how MFA (malfunction alert) signalling is done by the SP in the prior art, which is represented by step 13 in FIG. 1 and is also used in step 99 in FIG. 9. The MFA process is started by a checkstop signal being issued by the SP for the failing CPUf.

Step 31 is entered in FIG. 3 in which the SP writes the MC checkstop code into the private HSA for CPUf. The HSA is accessible only to microcode (and not to OS or to any application). This checkstop code tells CPUf that it is disabled and cannot operate. In step 32 the SP writes the CPUf identifier (ID) into the private HSAs of every CPU in the system (except for CPUf), which indicates the failure of CPUf to all healthy CPUs in the system. Then in step 33, the SP sends an MFA external interrupt signal to every CPU to tell them to take the interruption. Step 34 represents the first CPU to become enabled for external interruptions as the one of plural CPU's (if there are plural CPU's in the system) which will take the MFA interruption, and thereafter the interruption is no longer available to any other CPU which later becomes enabled for interruption.

PREFERRED EMBODIMENT

The process in FIG. 9 is invoked when a solid error is detected by step 5 in FIG. 1 after all retry efforts fail to correct the problem. In FIG. 9 step 91 is entered, in which CPUf sends a checkstop signal to the SP, requesting that CPUf operation be stopped including stopping the cycle clocks in CPUf.

Then in step 92, the SP signals CPUf to store the data contents in its registers. This includes storing all register data (e.g. the GPRs, FPRs, CRs, ARs, etc.) needed for interruption in the logout area of the PSA of CPUf. CPUf may or may not be successful in doing this register store operation, depending on the type of solid error existing in CPUf. It is preferable to have CPUf do the storing, if it is able, rather than SP, since usually the SP is a slower processor than CPUf. If the CPUf storing is successful, steps 93, 94 and 95 are skipped.

But if the CPUf storing is not successful, steps 93 is entered for the SP to perform the storing that CPUf failed to do in step 92. Then the SP does the storing of this register information in the PSA logout area of CPUf, and step 94 is entered in which the SP completes any outstanding stores of CPUf. The SP store operations of step 94 may or may not be successful, which is indicated by setting on or off an SLV (store logical valid) flag bit in the MCICf. If a store error occurs, the SLV bit is set to 0 in step 95B, and if no store error occurs, the SLV bit is set to 1 in step 95A; and in either case, step 96 is entered.

In step 96 the SP set the validity flag bits, the PD (processor damage) bit and the CSLO (checkstop logout) bit to indicate the checkstop condition of CPUf to the OS when it examines the PSA for CPUf. Each validity flag bit is set on of off in step 96 for each type of register found to have error-free or erroneous contents, respectively, in step 93. Accordingly, the set of valid bits in MCICf may indicate all types of saved register contents are error-free, or the MCICf set may indicate that less than all types of saved register contents are error-free. This invention takes different actions (represented near the end of FIG. 11) depending on whether the MCICf valid bits indicate all register contents were saved error-free, or whether only some types of register contents were saved error-free.

In step 97, the SP saves the current CPUf PSW in the MC old PSW in the CPUf PSA, and in step 98 the SP sets CPUf into a checkstopped state in which CPUf has its cycle clocks stopped so it can no longer function as a normal CPU. In step 99, the SP signals a malfunction alert (MFA) (shown in detail in FIG. 3) to all CPUs except CPUf.

Then step 101 is entered to determine if an operable CPU exists in the system on which the CPUf terminated task can be dispatched. The invention requires a system having plural CPUs, since this invention requires a switching of the terminated task from CPUf to a CPUh. However, some systems have restrictions on how CPUs can be dispatched. In some MP systems, any task can be dispatched on any CPU in the system, which provides maximum CPU flexibility and sharing. But in other MP systems, one or more of its CPUs may be dedicated to a single type of job or to only one of plural OSs. An example of an MP system allowing CPU dedication to a particular OS is an ESA/370 multiple CPU system using the IBM PR/SM hypervisor.

If no healthy CPU is available to continue the interrupted task from the failing CPUf, the no exit from step 101 is taken to step 102 to ABEND the CPUf terminated task since no CPU resource is available to continue its execution. But the yes path is taken from step 101 to exit 10 to proceed with the process of enabling the continuation of the execution of the terminated CPUf task if a CPUh is available, and FIG. 10 is entered.

Figure 10:
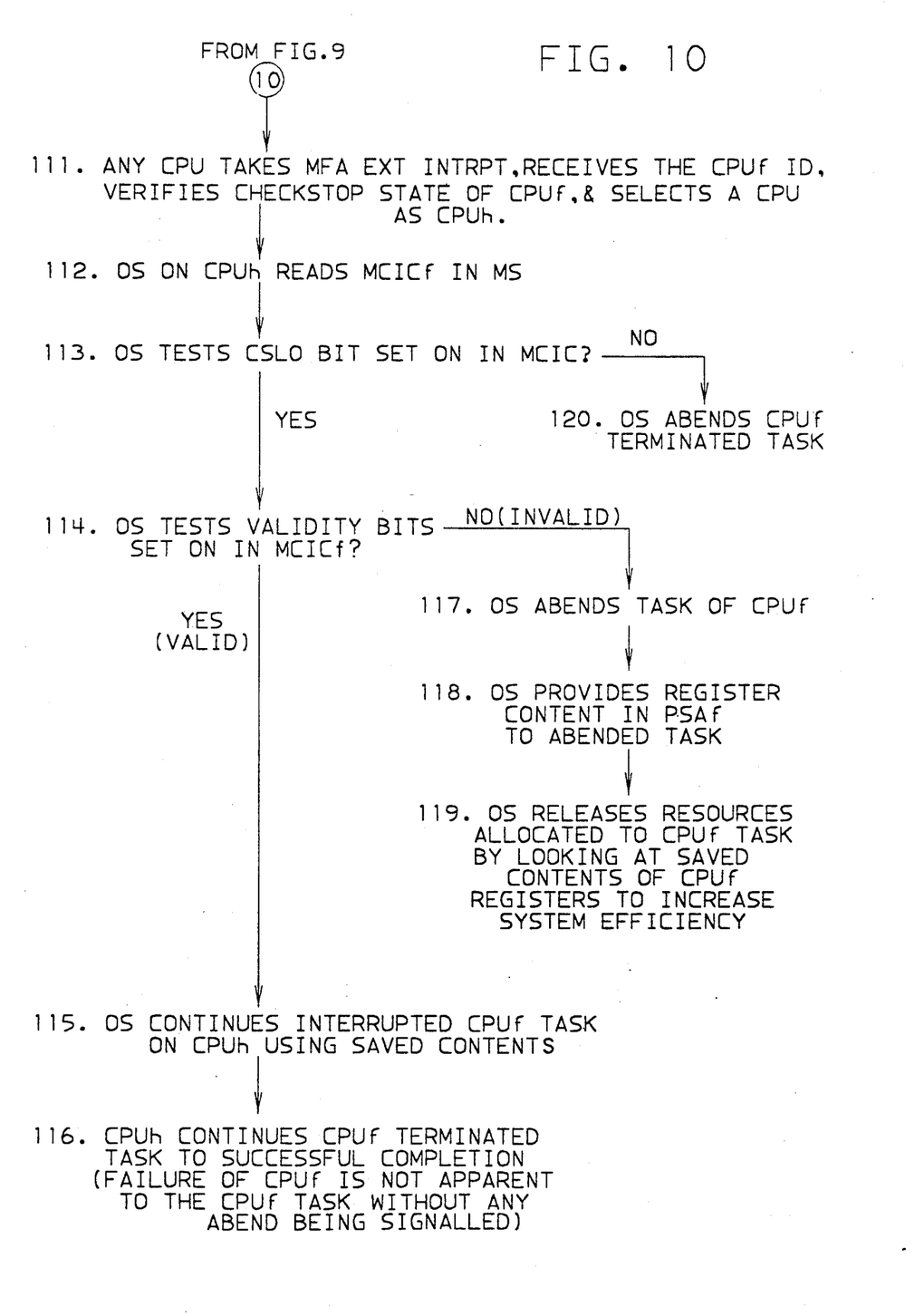

Step 111 in FIG. 10 involves the selection of one among the one or more operational CPU(s) to be available for continuing the execution of the CPUf terminated task. One or two CPUs may be involved in the performance of step 111. The first operational CPU available to take an outstanding external interruption will take this MFA external interruption. Then the interrupted CPU: receives the CPUf ID previously put into its HSA by step 32, senses the checkstop field for CPUf in the SIGP status block 81 in FIG. 8A to verify the checkstop state of CPUf, and assigns one of the operational CPUs as CPUh. CPUf is identified using a SIGP instruction which has microcode that reads the CPU ID field in block 82 in FIG. 8B.

Then in step 112, the OS routine on CPUh reads the MCIC in the PSA for CPUf (i.e. MCICf). In step 113 the OS routine tests the state of the CSLO flag bit in MCICf. The CSLO bit is new in this embodiment of the invention; and if the old process explained with FIGS. 1-3 is used, the CSLO bit will not be set on, and the no path is taken to step 120 which ABENDs the CPUf terminated task.

But the yes path to step 114 is the normal path used by this embodiment because the CSLO bit will be set on when CPUf failed. In step 114 the OS tests the state of the validity bits in MCICf, and if any validity bit indicates its register type is not validly stored, the no path to step 117 is taken in which OS ABENDs the CPUf terminated task. Then optional step 118 in this novel embodiment enables OS to link the PSAf saved contents of the CPUf registers to its prematurely terminated application program, for example, by OS putting the saved data in a file and linking it to the CPUf terminated program. Then the next time OS schedules that program for dispatch in a new task, the program will have the availability of the interruption data acquired during the ABENDing of its last execution, which data can be used to recover, correct, or make more efficient the complete execution of the program to obtain the required results.

And in step 119 after ABENDing the CPUf task, this invention provides the saved contents of the CPUf registers (and particularly the contents of the control registers) to OS which analyzes the contents to identify the system resources tied up by the CPUf terminated task, and then OS releases these resources so they can be reallocated to other tasks. This OS release of resources makes more resources available in the system for allocation to future tasks to enable the overall system to operate more efficiently.

But most of the time, step 114 will find all of the validity bits in MCICf are set on because all interruption information has been validly stored, and then step 115 is entered. In step 115, OS dispatches the CPUf terminated task on CPUh, for which OS fetches the saved contents of the CPUf registers in the CPUf PSA and loads these contents into the corresponding registers in CPUh, and OS sets up the current PSW for CPUh by loading it with the saved MC old PSW to enable the task execution to continue starting with the address of the instruction in the task following the last instruction correctly executed after which the task was terminated by the CPUf failure.

Thus, while the invention has been described with reference to preferred embodiments thereof, it will be understood by those skilled in the art that various changes in form and details may be made without departing from the scope of the invention.

Having thus described my invention, what I claim as new and desire to secure by Letters Patent is:

1. A method in a multi-processor computer system of continuing the execution of a program or program task which is terminated before completion when is executing on a processor which fails due to a hard error condition, comprising the steps of:

copying contents of registers in a failing processor into storage to store a predetermined program continuation interruption state when the processor detects a hard error condition;

sending a signal identifying the failing processor to an other processor which is operational;

checking by the other processor of validity of contents stored by the copying step; and signalling healthy processor(s) in the system of a request for a healthy processor to continue execution of the program or program task if the checking step finds validity;

selecting of a healthy processor to continue execution of the program or program task by signalling remaining healthy processor(s) of a selection, and loading into a selected processor from storage the stored program continuation interruption state of the failing processor to continue execution of the program or program task from a last successfully executed instruction without having any abnormal end indicated for the program or program task.

2. A method of continuing the execution of a program as defined in claim 1, further comprising:

setting an indicator field in storage for identifying the failing processor to an operating system and for indicating the failing processor is terminating operation for the program or program task.

3. A method of continuing the execution of a program as defined in claim 1, further comprising:

signalling by the failing processor to a service processor of the processor failure; and the copying of the contents of the registers in the failing processor being done by the failing processor if the failing processor is able, but the copying being done by the service processor if the failing processor is not able.

4. A method of continuing the execution of a program as defined in claim 3, further comprising:

signalling by the service processor of a malfunction alert for the failing processor to at least one operational processor to request the operational processor to continue processing the terminated program.

5. A method of continuing the execution of a program as defined in claim 3, further comprising:

the storing of the register contents being done in a logout area in system main storage assigned for use by the failing processor.

6. A method of continuing the execution of a program as defined in claim 3, further comprising:

setting by the service processor of flag bits in a storage area accessible by a system control program controlling the operation of the failing processor and at least one other operational processor.

7. A method of continuing the execution of a program as defined in claim 3, further comprising:
stopping the operation of the failing processor to allow maintenance; and
setting by the service processor of a processor-stopped indicator field in a hardware storage area accessible by microcode/processor hardware operation but not by any operating system or application program, and stopping the failed processor operation.

8. A method of continuing the execution of a program as defined in claim 7, further comprising:
assuring that all outstanding stores done by the failing processor are at least on a bus to memory and external of the failing processor before stopping the operation of the failing processor.

9. A method of continuing the execution of a program as defined in claim 8, further comprising:
setting by the service processor in the storage area accessible by the system control program of validity indicator bits for conditions required for continuing execution of the terminated program.

10. A method of continuing the execution of a program as defined in claim 9, further comprising:
setting by the service processor in the storage area accessible by the system control program of validity indicator bits for the copied register contents.

11. A method of continuing the execution of a program as defined in claim 10, further comprising:
setting by the service processor in the storage area accessible by the system control program of a machine check old PSW (program status word) for indicating the address in the terminated program from the failed processor where the continuation of instruction processing is to occur.

12. A method of continuing the execution of a program as defined in claim 4, the signalling of a malfunction alert further comprising:
sending the malfunction alert signal to all operational processors to request at least one of the operational processors to continue processing the terminated program.

13. A method of continuing the execution of a program as defined in claim 12, the malfunction alert signal further comprising:
transmitting an external interruption signal to all operational processors.

14. A method of continuing the execution of a program as defined in claim 12, further comprising:
storing a malfunction alert signal with an identifier of the failed processor in a hardware storage area accessible by microcode/processor hardware operation but not by any operating system or application program assigned to each operational processor.

15. A method of continuing the execution of a program as defined in claim 13, further comprising:
stopping the operation of the failing processor when the microcode senses the MFA indication to allow maintenance on the failed processor; and
setting by the service processor of an identifier for the failed processor in the hardware storage area, and a selected operational processor sensing the identifier of the failed processor to determine its identification.

16. A method of continuing the execution of a program as defined in claim 12, further comprising:
testing the number of operational processors in the system to determine if there is at least one operational processor in the system; and
abnormally ending the terminated program if there is no operational processor in the system.

17. A method of continuing the execution of a program as defined in claim 12, further comprising:
selecting an operational processor as the continuing processor for continuing the execution of the program terminated on the failed processor as the first operational processor to become enabled for interruptions after the malfunction alert signalling.

18. A method of continuing the execution of a program as defined in claim 17, selecting operation further comprising:
interrupting an operational processor to select a processor to continue the execution of the terminated program.

19. A method of continuing the execution of a program as defined in claim 18, selecting operation further comprising:
selecting a processor different from the interrupted operational processor for continuing the execution of the terminated program.

20. A method of continuing the execution of a program as defined in claim 18, selecting operation further comprising:
selecting the interrupted operational processor as the processor for continuing the execution of the terminated program.

21. A method of continuing the execution of a program as defined in claim 20, further comprising:
preparing for the continued execution of the terminated program by initiating an operating system routine on the selected processor by fetching an address in a machine check new PSW in the saved information for the terminated program on the failed processor.

22. A method of continuing the execution of a program as defined in claim 21, further comprising:
executing the operating system routine on the selected processor to read a checkstop indicator field in the machine check interruption code stored in an area in main memory assigned to the failed processor in order for the selected processor to learn that the failed processor has failed, and continuing the execution of the terminated program only if the checkstop indicator field indicates a checkstopped condition.

23. A method of continuing the execution of a program as defined in claim 22, further comprising:
abnormally ending the terminated program if no checkstop condition is indicated in the checkstop indicator field in the machine check interruption code.

24. A method of continuing the execution of a program as defined in claim 22, the execution of the operating system routine further comprising:
testing the state of the validity bits in the machine check interruption code; and
abnormally ending the terminated program if any validity bit indicates an invalid state in the machine check interruption code.

25. A method of continuing the execution of a program as defined in claims 22 or 23, executing the operating system routine and further comprising the steps of:
  accessing the register contents for which validity bits indicate a valid state;
  using the valid register contents to identify resources allocated to the abnormally ended program; and
  releasing the resources from the abnormally ended program by action of an operation system.

26. A method of continuing the execution of a program as defined in claim 1 by controlling the process of claim 1 with the steps of:
  repeating the execution of an instruction a plurality of times as long as the instruction execution is detected to have an error, and detecting a solid error in the hardware of the processor when a predetermined number of repeated executions have occurred without the instruction executing error-free; and then
  initiating the process defined in claim 1.

27. A method of continuing the execution of a program as defined in claim 1 by controlling the process of claim 1 with the steps of:
  detecting an error in the hardware of the processor when an instruction execution has occurred with an error condition; and then
  initiating the process defined in claim 1 even though the error condition of the processor hardware is an intermittent type of error condition.

28. A method of continuing the execution of a program as defined in claim 1 by controlling the process of claim 1 with the steps of:
  detecting degradation in the state of the hardware of a processor caused by occasional removal of failing hardware components;
  determining when the degradation state of the processor has exceeded a predetermined threshold level; and
  initiating the process defined in claim 1 when the predetermined threshold level has been exceeded for continuing a current task on another processor before taking the processor off line for performing maintenance.

29. A method of continuing the execution of a program as defined in claim 28, in which the determining step comprises:
  testing the performance rate of the processor in relation to a predetermined processor performance rate to find when the predetermined threshold level has been exceeded.

* * * * *